United States Patent [19]

Kosuge et al.

[11] Patent Number: 4,621,103

[45] Date of Patent: Nov. 4, 1986

[54] AMINOPOLYOL ANION EXCHANGE RESINS FOR SEPARATION ISOTOPES

[75] Inventors: Masao Kosuge, Kitakyushu; Junji Fukuda, Yokohama, both of Japan

[73] Assignee: Mitsubishi Chemical Industries Ltd., Tokyo, Japan

[21] Appl. No.: 645,489

[22] Filed: Aug. 29, 1984

[30] Foreign Application Priority Data

Nov. 11, 1983 [JP] Japan .................................. 58-212246

[51] Int. Cl.$^4$ ................................................ C08D 5/20
[52] U.S. Cl. ...................................................... 521/28
[58] Field of Search .......................... 521/28, 30, 25, 38

[56] References Cited

U.S. PATENT DOCUMENTS

| | | | |
|---|---|---|---|
| 2,689,833 | 9/1954 | Hwa | 521/30 |
| 2,723,245 | 11/1955 | Wheaton | 521/30 |
| 3,310,530 | 3/1967 | White | 521/30 |
| 3,887,460 | 6/1975 | Ward et al. | 521/30 |

OTHER PUBLICATIONS

Chem. Abstracts, vol. 74, 1971, entry 57179x.

Primary Examiner—Joseph L. Schofer
Assistant Examiner—Peter F. Kulkosky
Attorney, Agent, or Firm—Jordan B. Bierman

[57] ABSTRACT

An anion exchange resin for separating boron isotopes which is a resin having an aminopolyol group as a functional group and has been treated with an alkali solution containing:

A: an alkali metal hydroxide or ammonium hydroxide; and

B: an alkali metal salt or an ammonium salt and which is to be used in steps comprising passing a boric acid solution through a column packed with said resin to form a boric acid adsorption band and thereafter developing said adsorption band with an acid solution thereby separating boron isomers.

6 Claims, 1 Drawing Figure

AMINOPOLYOL ANION EXCHANGE RESINS FOR SEPARATION ISOTOPES

BACKGROUND OF THE INVENTION

1. Field of the Invention

This invention relates to anion exchange resins for separating boron isotopes. More specifically, it relates to anion exchange resins for separating boron isotopes, which have an aminopolyol group as a functional group and have been treated with a specific alkali solution.

2. Description of the Prior Art

Boron is found in nature in such proportion that about 20% is Boron 10 ($^{10}B$) and about 80% is Boron 11 ($^{11}B$), of which Boron 10 has excellent characteristics as an absorber for neutron generated in nuclear reactions and hence used as a neutron abosrbing material such as control rods in various nuclear reactors and thus is an essential substance in the nuclear industry.

However, as described above, since $^{10}B$ is present in nature in a proportion of about 20% and the rest is $^{11}B$ having almost no neutron absorbing ability, it is necessary to separate and concentrate $^{10}B$ from natural boron which is a mixture of $^{10}B$ and $^{11}B$ isotopes in order to efficiently absorb neutron and control it in a nuclear reactor etc.

One known method for separating boron isotopes comprises effecting separation by ion exchange chromatography using a plurality of ion exchange columns packed with ion exchange resins, in particular, since styrenic chelate type ion exchange resins having an aminopolyol of the following general formula [I]:

$$-N{\diagup CH_2-[CH(OH)]_n-CH_2OH \atop \diagdown R} \qquad [I]$$

wherein n is an integer of 1–6 and R represents a hydrogen atom, an alkyl group of 1–5 carbon atoms or a group: $-CH_2[CH(OH)]_m-CH_2OH$ wherein m is 0 or an integer of 1–6 which has high selectivity on boron as a functional group have a higher isotope separation coefficient ($\alpha_{11}^{10}$) represented by the following equation [II]:

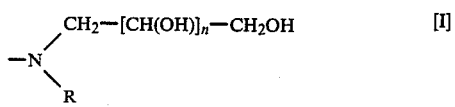

$$\alpha_{11}^{10} = \frac{\left(\begin{array}{c}\text{Molar Concentration of}\\ ^{10}B\text{ in Ion Exchange Resin}\end{array}\right) \Big/ \left(\begin{array}{c}\text{Molar Concentration of}\\ ^{11}B\text{ in Ion Exchange Resin}\end{array}\right)}{\left(\begin{array}{c}\text{Molar Concentration of}\\ ^{10}B\text{ in Solution}\end{array}\right) \Big/ \left(\begin{array}{c}\text{Molar Concentration of}\\ ^{11}B\text{ in Solution}\end{array}\right)} \quad [II]$$

as compared with the values with other conventional strongly basic anion exchange resins and weakly basic anion exchange resins, the above method is an interesting method. As resins useful in the present invention, Diaion CRB02 (tradename, produced by Mitsubishi Chemical Industries, Ltd.) and Amberlite IRA-743 (produced by Rohm & Haas Co.) have hitherto been on market. Of those, Amberlite IRA-743 (old name: XE-243) is used in the boron isotope separation described in French Pat. No. 1520521.

However, the resins of this type generally have slow reaction rates for adsorption and desorption of boric acid, and further in the separation of boron isotopes, the reaction rate for isotope exchange between $^{10}B$ and $^{11}B$ is slow. In other words, the value of HETP (Height Equivalent of a Theoretical Plate) which is a measure representing an isotope exchange reaction rate expressed by the following equation [III]:

$$HETP = \frac{(L_2 - L_1)\log \alpha_{11}^{10}}{\log \dfrac{R_2}{R_1}} \qquad [III]$$

wherein $R_1$ and $R_2$ each represents a proportion of isotopes at positions $L_1$ and $L_2$ of the boron isotope concentration band was high and therefore the method for separating boron isotopes using said chelate type anionic ion exchange resins could not be accepted as a particularly excellent separating method.

The present inventors have been studying on a method for separating and concentrating boron isotopes using an anion exchange resin having an aminopolyol group as a functional group and have come to discover that by raising the operational temperature, the ion exchange rate of boric acid is enhanced, the HETP is reduced and the solubility of boric acid is increased. However, it has also been discovered that when said ion exchange resin is maintained at high temperatures for a prolonged time, the functional group undergoes thermal deterioration to cause a fluctuation in the amount of the boric acid adsorbed and a fluctuation in the resin volume and therefore stable chromatograph development is hampered.

SUMMARY OF THE INVENTION

Accordingly, it is an object of this invention to provide an anion exchange resin which can efficiently perform the separation and concentration of boron isotopes without causing thermal deterioration even when operated at high temperatures.

In other words, the gist of this invention resides in an anion exchange resin for separating boron isotopes which is a resin having an aminopolyol group as a functional group and has been treated with an alkali solution containing:

A: an alkali metal hydroxide or ammonium hydroxide; and

B: an alkali metal salt or an ammonium salt and which is to be used in steps comprising passing a boric acid solution through a column packed with said resin to form a boric acid adsorption band and thereafter developing said adsorption band with an acid solution thereby separating boron isotopes.

DETAILED DESCRIPTION OF THE INVENTION

Figure 1:
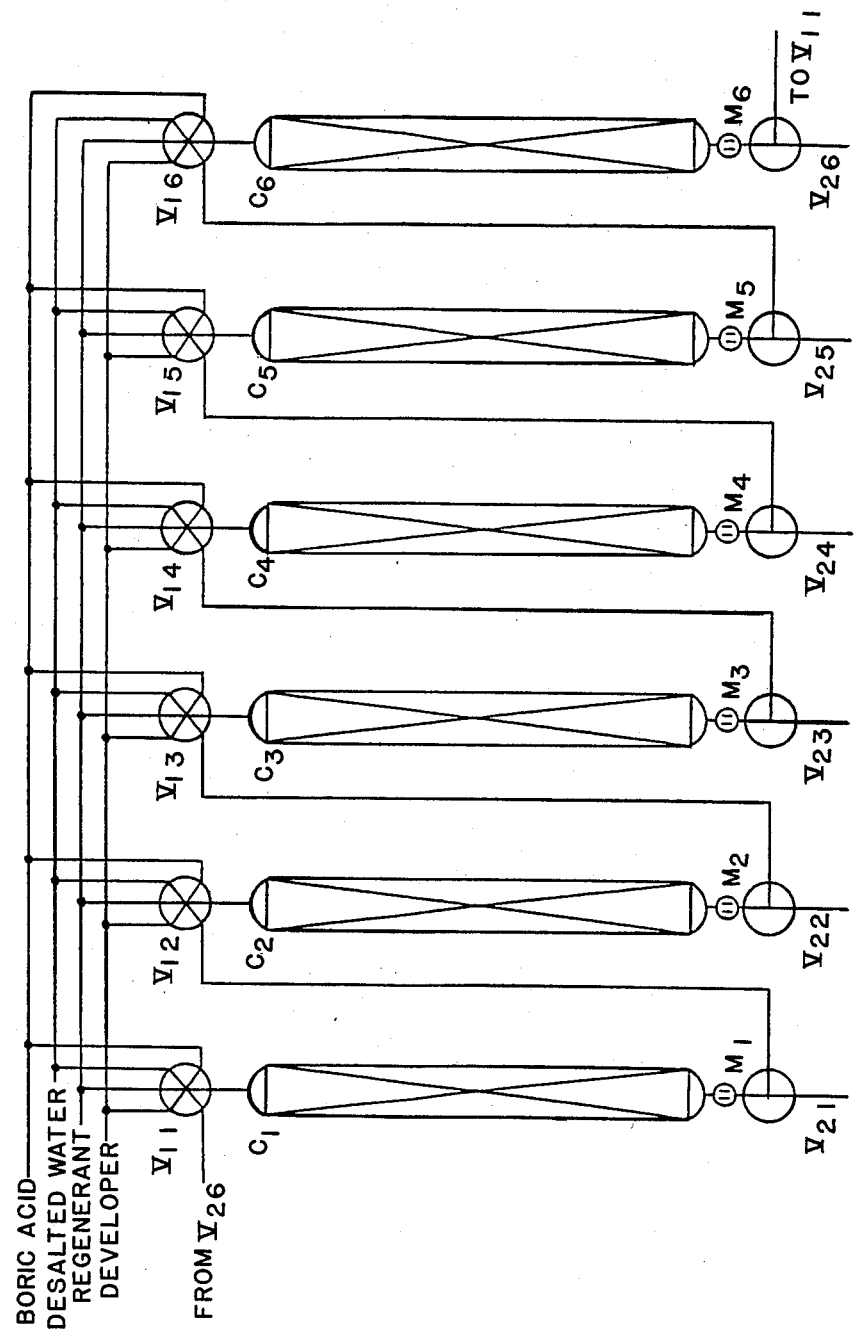
FIG. 1 is a conceptive figure showing ion exchange resin columns, their piping and valves for practicing this invention.

The anion exchange resin having an amino-polyol group as a functional group used in this invention is produced by firstly producing a crosslinked polymer having a halomethyl group and thereafter reacting it with a specific amine.

The crosslinked polymer having a halomethyl group may be produced by various conventional processes, for example, a process which comprises copolymerizing a monovinyl aromatic monomer such as styrene and a polyvinyl aromatic monomer such as divinylbenzene to obtain a gel-formed copolymer and reacting it with chloromethyl methyl ether, a process which comprises conducting the aforesaid copolymerization in the presence of an aromatic linear polymer such as polystyrene, then removing said linear polymer by solvent extraction to obtain a porous copolymer and thereafter reacting it with chloromethyl methyl ether, a process which comprises conducting polymerization by adding about 5–200% by weight of the total monomers of a solvent which dissolves the aforesaid monomers but does not dissolve the formed crosslinked copolymer, e.g., n-pentane, i-octane, n-heptane etc. and halomethylating the formed crosslinked copolymers by the procedures described hereinabove, and the like.

As the monovinyl aromatic monomer used in the above-described processes, styrene and other aromatic vinyl compounds such as vinyltoluene, ethylstyrene, vinylanisole, vinylnaphthalene etc. are useful. As the polyvinyl aromatic monomer, divinylethylbenzene, divinyltoluene, divinylnaphthalene, divinylxylene, divinyl ether, ethylene glycol dimethacrylate, ethylene glycol diacrylate, divinyl ketone polyacryl ether etc. as well as divinylbenzene are useful, and the amount thereof used can vary over a wide range but is preferably 2–50% by weight based on the total monomers.

The copolymerization may be conducted by adding 0.1–10% by weight of the monomers of a polymerization catalyst such as benzoyl peroxide, lauroyl peroxide, azobisisohutylonitrile etc. and heating to 60°–90° C. in suspension using water as a medium for 6–20 hours.

The halomethylation of the aromatic crosslinked copolymer may be conducted by a conventional process, for example, by warming to 40°–60° C. with chloromethyl methyl ether in the presence of a Friedel-Crafts catalyst such as zinc chloride. The amount of the chloromethyl methyl ether can vary over a wide range but is preferably in the range of 80–500 g per 100 g of the aromatic crosslinked copolymer.

In addition to the above-described processes, the aromatic crosslinked copolymer having a halomethyl group may also be produced by a process which comprises crosslinking and copolymerizing a halomethylated aromatic monovinyl compound such as chloromethylstyrene and a polyvinyl compound such as divinylbenzene by the procedures described hereinabove.

The specific amine to be reacted with the aforesaid crosslinked copolymer having a halomethyl group is that of the following general formula [IV]:

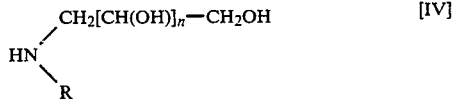

wherein n is an integer of 1–6 and R represents a hydrogen atom, an alkyl group of 1–5 carbon atoms or a group —CH$_2$[CH(OH)]$_m$—CH$_2$OH wherein m is 0 or an integer of 1–6.

Specific examples of the aforesaid specific amine include N-glucamine, N-galactamine, N-mannosamine, N-arabitylamine, N-methylglucamine, N-ethylglucamine, N-methylgalactamine, N-ethylgalactamine, N-methylmannosamine, N-ethylmannosamine, diarabitylamine etc.

The reaction of the crosslinked copolymer having a halomethyl group obtained by one of the processes described hereinabove and the aforesaid specific amine may be conducted in the presence of an appropriate solvent by warming at a temperature of 20°–100° C. for 2–20 hours. Examples of the solvent include water, ether type solvents such as dioxane etc., ketone type solvents such as acetone, methyl ethyl ketone etc., halogenated hydrocarbon type solvents such as chloroform, dichloroethylene, chlorobenzene etc., aromatic hydrocarbon type solvents such as benzene, toluene etc., and alcohol type solvents such as methanol, ethanol etc. At the same time, in order to promote the reaction, potassium iodide, sodium hydroxide etc. may also be added.

While the particle diameter of the anion exchange resin thus obtained is determined taking into consideration the isotope exchange reaction rate in the boron isotope separation, the adsorption and desorption rates of the boric acid and acid in the acid development, the pressure loss of the ion exchange column packed with said resin etc., the average particle diameter of said resin may be in the range of 50–300 microns under the conditions of the boric acid concentration and the operational temperature in the aforesaid range.

The anion exchange resin of this invention is that obtained by treating the resin obtained as above with a specific alkali solution and such an alkali solution is that containing both A and B described below:

A: an alkali metal hydroxide or ammonium hydroxide; and

B: an alkali metal salt or an ammonium salt.

Examples of the alkali metal hydroxide include sodium hydroxide, potassium hydroxide, lithium hydroxide etc., examples of the alkali metal salt include sodium chloride, potassium chloride, sodium sulfate etc., and examples of the ammonium salt include ammonium chloride, ammonium sulfate etc.

Further, examples of the alkali solution containing A and B include aqueous solutions of sodium hydroxide and sodium chloride, potassium hydroxide and sodium sulfate, sodium hydroxide and sodium sulfate, ammonium hydroxide and sodium sulfate, ammonium hydroxide and ammonium chloride, ammonium hydroxide and ammonium sulfate etc., of those aqueous solutions of ammonium hydroxide and ammonium chloride or ammonium sulfate being desired. The concentration of the mixed solution of A and B is preferably such that the concentration of A is in the range of 0.5–10% by weight, and the mixing ratio of A to B in this mixed solution may suitably be in the range of 1:10 to 5:1 in the equivalent ratio.

The method for separating boron isotopes using the anion exchange resin of this invention may be achieved by packing a column with an anion exchange resin already treated with the alkali solution as described above or packing an untreated anion exchange resin in the column and passing the alkali solution containing A and B as above to prepare a packed column.

A boric acid solution is passed through the thus prepared column to form a boric acid adsorption band. The concentration of the boric acid solution when the boric acid adsorption band is formed may be in the range of 0.2–2 moles (M)/l. This boric acid concentration may suitably be determined taking into consideration that when the concentration is low, there is an advantage of a greater separation coefficient but also there is a disadvantage of an increase in the amount of the solution used for the development, whereas where the concentration is high, the separation coefficient is low but although the amount of the boric acid adsorbed to said resin is increased, the amount of the acid adsorbed to the resin, said acid being e.g. hydrochloric acid, sulfuric acid etc. used for the separation, is not considerably influenced by the outer solution concentration and therefore there is an advantage that a greater amount of the boric acid can be developed with a lesser amount of the acid and the like.

The temperature when passing the boric acid solution is for example in the range of 40°–100° C.

The anion exchange column in which the boric acid adsorption band has been formed as above is thereafter developed with an acid thereby boron isotopes are separated and concentrated as boric acid, and the acid used therefor is suitably a mineral acid such as hydrochloric acid, sulfuric acid etc.

The concentration of these acids is in the range of 0.2–2 M/l. The rate for passing the acid (LV) is in the range of 0.5–20.0 m/hr.

The temperature when developing the boric acid adsorption band with the acid is in the range of 60°–100° C.

The method for separating and concentrating boron isotopes using ion exchange columns packed with the anion exchange resin of this invention is now particularly described. The separating and concentrating method used in this invention may be any selected from (1) a reverse break-through method, (2) a displacement developing method and (3) a method combining a reverse break-through method and a displacement developing method.

(1) Reverse Break-through Method (Bull. Chem. Soc., JPN. Vol. 53, No. 7, p. 1860)

An example of the method of this invention using the reverse break-through method is explained with reference to FIG. 1. In FIG. 1, $C_1$–$C_6$ are ion exchange columns packed with the aforesaid anion exchange resin used in this invention. The temperature in each column is maintained constant by warming the feed solution and also circulating e.g. hot water through a jacket provided on the column or providing an insulating material around the column. $V_{11}$–$V_{16}$ are solution switch valves for supplying the solution to the respective columns, $V_{21}$–$V_{26}$ are solution switch valves for dividing the solution withdrawn from the respective columns, and $M_1$–$M_6$ are detectors for monitoring boric acid adsorption bands.

In the first place, the respective ion exchange columns $C_1$–$C_6$ are regenerated with an alkali solution of e.g. sodium hydroxide, ammonium hydroxide etc., then washed with desalted water, $C_1$–$C_6$ are connected in series, then by supplying a boric acid solution from $V_{11}$ while withdrawing it from $V_{26}$, the boric acid solution is supplied to said resin until equilibrium. Thereafter, an acid solution is supplied from $V_{11}$ to develop the boric acid adsorbed to said resin while withdrawn from $V_{26}$. Thus, the development with the acid is continued, and when the rear end interface of the boric acid adsorption band has moved to Column $C_2$, the supply of the acid is switched to $V_{12}$ and Column $C_1$ which has become an acid adsorbed form is regenerated by supplying the alkali solution and withdrawing it from $V_{21}$, then washed with desalted water by supplying it from $V_{11}$ and withdrawing it from $V_{21}$, and boric acid is passed through the resin inside Column $C_1$ until equilibrium by supplying a boric acid solution from $V_{11}$ and withdrawing it from $V_{21}$. The steps of the regeneration, water washing and boric acid adsorption are conducted so as to be completed before when the rear end interface of the boric acid adsorption band has moved from Column $C_2$ to Column $C_3$, and when the rear end interface of the boric acid adsorption band has moved to Column $C_3$, the supply of the acid is switched to $V_{13}$, $V_{26}$ is connected to $V_{11}$, and the solution from the development of the boric acid adsorption band is withdrawn using $V_{21}$ while the development of the boric acid adsorption band with the acid is continued. Then, similarly with the above Column $C_1$, Column $C_2$ is regenerated, washed with desalted water and subjected to boric acid adsorption. By repeating these procedures, $^{10}B$ is concentrated at the rear end interface of the boric acid adsorption band. When the degree of $^{10}B$ concentration reaches the desired concentration, by e.g. withdrawing from the withdrawal valve beneath the ion exchange column, a $^{10}B$ concentrate is produced.

(2) Displacement Developing Method (J. Am. Chem. Soc., Vol. 77, p. 6125)

This method is described using an anion exchange resin and an apparatus similar to those in the above-described reverse break-through method (1) with reference to FIG. 1.

In other words, ion exchange columns $C_1$–$C_6$ are regenerated with an alkali solution of e.g. sodium hydroxide etc., Column $C_1$ to Column $C_3$ are connected in series, and a boric acid solution is passed through until complete equilibrium by supplying the boric acid solution from $V_{11}$ while withdrawing it from $V_{23}$. Thereafter, Column $C_1$ to Column $C_5$ are connected, the acid solution is supplied from $V_{11}$ to conduct the displacement development of the boric acid adsorption band. When the rear end interface of the boric acid adsorption band has moved to Column $C_2$, the acid supply is switched from $V_{11}$ to $V_{12}$ and at the same time Column $C_6$ is connected and the solution withdrawal is switched from $V_{25}$ to $V_{26}$, thereby the displacement development is continued.

On the other hand, Column $C_1$ the development of which has been finished is regenerated by supplying the alkali solution from $V_{11}$ and withdrawing it from $V_{21}$, and similarly washed with desalted water for the next development. The operations of the regeneration and water washing of Column $C_1$ are conducted so as to be completed before the rear end interface of the boric acid adsorption band moves to Column $C_2$. When the rear end interface of the boric acid adsorption band has moved to Column $C_3$, the supply of the acid is switched from $V_{12}$ to $V_{13}$, then Column $C_1$ is connected subsequent to Column $C_6$, and the solution is withdrawn from $V_{21}$, thereby the displacement development is continued. During that time, Column $C_1$ is regenerated and washed with desalted water. By repeating these procedures, $^{11}B$ is concentrated at the front end interface of the boric acid adsorption band and $^{10}B$ at the rear end interface, and when each reaches the desired degree of concentration, for example, when each interface just passes through the withdrawal valve beneath each ion exchange column, each is withdrawn, and boric acid in a molar amount corresponding to the amount withdrawn is then supplied as a boric acid solution from the boric acid supply valve above the ion exchange column at the time when the part in the boric acid adsorption band where the isotope compositional ratio is the same as that of the starting material boric acid just passes through the valve, thereby the production of $^{10}B$ and $^{11}B$ concentrates and the supply of the starting material boric acid are effected.

(3) Method Combining a Reverse Break-through Method and a Displacement Developing Method An example of this method is explained also using FIG. 1. For example, ion exchange columns $C_1$–$C_6$ are regenerated with an alkali solution of e.g. sodium hydroxide etc., then washed with desalted water, Column $C_1$ to Column $C_4$ are connected in series, and a boric acid solution is passed therethrough until complete equilibrium by supplying the boric acid solution from $V_{11}$ and withdrawing it from $V_{24}$. Thereafter, similarly as in the reverse break-through method (1), while the boric acid adsorbed to said resin is developed with an acid solution from $V_{11}$, it is withdrawn from $V_{24}$. At that time, the boric acid solution is passed through Column $C_5$ until complete equilibrium by supplying the boric acid solution from $V_{15}$ and withdrawing it from $V_{25}$. The development is continued by supplying the acid from $V_{11}$, and when the rear end interface of the boric acid adsorption band has moved to Column $C_2$, the supply of the acid is switched from $V_{11}$ to $V_{12}$, and at the same time, Column $C_5$ is connected subsequent to Column $C_4$, and the solution is withdrawn from $V_{25}$, thereby the development is effected. While the rear end interface of the boric acid adsorption band proceeds inside Column $C_2$, the boric acid solution is supplied to Column $C_6$ from $V_{16}$ and withdrawn from $V_{26}$, thereby effecting the boric acid adsorption to Column $C_6$, then Column $C_1$ which has become an acid adsorbed form after the completion of the development is regenerated by passing the alkali solution from $V_{11}$ and withdrawing it from Vhd 21, and then washed with desalted water. Thereafter, when the rear end interface of the boric acid adsorption band development has moved to Column $C_3$, the supply of the acid is switched to $V_{13}$, then Column $C_6$ is connected subsequent to Column $C_5$, the solution is withdrawn from $V_{26}$, thereby the development is continued. At that time, Column $C_1$ undergoes the adsorption of the boric acid and Column $C_2$ is regenerated and washed with water. By repeating these operations, $^{10}B$ is concentrated at the rear end interface of the boric acid adsorption band. When $^{10}B$ has been concentrated to the intended concentration or its vicinity, the boric acid adsorption band is treated with the acid, thus the boric acid adsorption to the ion exchange column prior to the ion exchange column under development in series is ceased, and the ion exchange columns are switched from a 4-column series to a 5-column series and the displacement development (2) is effected. The displacement development of the boric acid adsorption band and the regeneration and water washing of the already developed columns are repeated, thereby the concentration of $^{10}B$ further proceeds at the rear end interface of the boric acid absorption band while $^{11}B$ is concentrated at the front end interface in an amount corresponding to the amount of $^{10}B$ concentrated and accumulated at the rear end interface after switching to the displacement development. Thereafter, at appropriate intervals, for example, at the time when the front end and rear end interfaces pass the withdrawal valves beneath the respective columns respectively, a $^{11}B$ concentrate and a $^{10}B$ concentrate are withdrawn and the boric acid solution is supplied in a molar amount corresponding to the moles of the withdrawn solution from the boric acid supply valve above the ion exchange column at the time when the part in the boric acid adsorption band where the isotope compositional ratio is the same as that of the starting material boric acid just passes through said valve, thereby the production of the $^{10}B$ and $^{11}B$ concentrates and the supply of the starting material boric acid are effected. This method is a method suitable for the production of a $^{10}B$ concentrate, especially a high concentrate.

The reason why the aforesaid alkali solution containing A and B used in this invention is effective on the high temperature stability of the anion exchange resin having an aminopolyol group as a functional group has not yet been clarified, but it is presumed as follows:

It is presumed that, as described above, the anion exchange resin used in this invention is produced as an anion exchange resin having an aminopolyol group as a functional group by reacting a chloromethylated crosslinked polymer with a specific amine of the aforesaid general formula [IV], and on this reaction, a group having a high degree of basicity and showing an ability to decompose neutral salts is formed, and this group showing an ability to decompose neutral salts undergoes thermal deterioration at a temperature of 40° C. or above, that is, the temperature for the development of the boric acid adsorption band of this invention, and exerts an influence on the thermal stability. And it is presumed that by using the alkali solution of this invention as a treating agent for the fresh resin or as a regenerating agent for the once used resin, this group becomes a salt form of a neutral salt and thermal stabilization is effected.

This invention is more particularly described by the following example, but it should be noted that this invention is not restricted to the example.

EXAMPLE

A crosslinked copolymer obtained by adding 95 g of i-octane to 95 g of styrene and 10 g of 55% divinylbenzene and polymerizing was chloromethylated with chloromethyl methyl ether, and N-methyl-D-glucamine was introduced thereto as a functional group to obtain an anion exchange resin (acid adsorption capacity: 2.81 meq/g-resin, salt spliting capacity: 0.69 meq/g-resin, water content: 63%, average particle diameter: 200 microns, uniformity coefficient: 1.3), then this resin in a free amine form was packed into 6 jacketed glass columns of 10 mm in inner diameter and 1000 mm in length in an amount of 75 ml of the resin respectively, and these were connected in series, then 1500 ml of a mixed aqueous solution of 0.5 N ammonium hydroxide and 0.5 M ammonium sulfate as an alkali solution of this invention was passed through the first column at a flow rate (LV) of 5 m/hr, then washed with demineralized water, and the inside of the column was maintained at 80° C. by passing constant temperature water at 80° C. through each jacket, and thus the separation of boron isotopes was effected by a reverse break-through method.

More particularly, 2000 ml of a 0.6 M boric acid aqueous solution preheated to 80° C. was passed starting from the first column at a flow rate (LV) of 5 m/hr thereby making the boric acid adsorbed to the resin in the six columns. Then, a 0.47 M sulfuric acid aqueous solution preheated to 80° C. was passed at a flow rate (LV) of 3 m/hr to develop the boric acid adsorbed to the resin, and 5 ml aliquots of the boric acid solution eluted from the sixth column were analyzed for the boric acid concentration to find that said boric acid concentration was 0.63 M/l and the amount of the boric acid adsorbed was 0.67 M/l-resin. At that time, the time required from the start of the development with the 0.47 M sulfuric acid aqueous solution to the end was 3.2 hours, and the moving speed of the rear end interface of the boric acid adsorption band was 180 cm/hr.

On the other hand, the $^{10}B/^{11}B$ boron isotope ratio in each obtained boric acid aqueous solution was measured by a solid mass spectrometer Model CH-5 manufactured by Varian Mat Co. to find that the $^{10}B$ concentration at the most rear end of the boric acid adsorption band was 26.4% against 19.85% of the $^{10}B$ concentration in the starting material boric acid of a natural composition originally adsorbed to the resin, and thus $^{10}B$ had been concentrated at the rear end interface of the boric acid adsorption band over a length of about 40 cm. The separation coefficient calculated therefrom was 1.015 and HETP was 7 mm.

Thereafter, while the column in which the development of the boric acid adsorption band with the sulfuric acid aqueous solution had been completed was maintained at 80° C., (1) 2000 ml of a mixed aqueous solution of 0.5 N ammonium hydroxide and 0.5 M ammonium sulfate was passed at an LV of 5 m/hr, (2) it was washed with 1000 ml of demineralized water at the same LV, (3) 2000 ml of a 0.6 M boric acid aqueous solution was passed at an LV of 5 m/hr, and (4) 1000 ml of a 0.47 M sulfuric acid aqueous solution was passed at an LV of 3 m/hr, and steps (1) to (4), designated as one cycle, were repeated 50 cycles, after which a separation test of boron isotopes was conducted in the same manner as above and the adsorbing ability and isotope separating ability of the resin against boric acid were measured to find that these abilities remained the same as those at the first time.

Further, after a series of tests, the resin was taken out of the columns and subjected to a performance test in the conventional manner to find that the acid adsorbing capacity was 2.81 meq/g, the Salt Spliting Capacity was 0.69 meq/g, the water content was 63%, and thus the performance of the resin was not changed at all. In addition, the columns of the resin per unit weight of the taken resin (sulfuric acid added form) was measured and the percent increase in volume relative to the regenerated resin (free amine form) was determined as 9%.

COMPARATIVE EXAMPLE

Using the same resin and apparatus as used in Example 1, separation of boron isotopes was conducted using an N sodium hydroxide aqueous solution as a treating agent and a regenerating agent by a reverse breakthrough method. That is, 2000 ml of 0.5 N sodium hydroxide was passed through six columns connected in series at a flow rate (LV) of 5 m/hr, then, after washing with demineralized water, constant temperature water at 80° C. was passed through each jacket to keep the inside of the column at 80° C., and a 0.6 M boric acid aqueous solution preheated to 80° C. was passed starting from the first column at a flow rate (LV) of 5 m/hr, thereby making the boric acid adsorbed to the resin in the six columns. Thereafter, a 0.47 M sulfuric acid aqueous solution preheated to 80° C. was passed at a flow rate (LV) of 3 m/hr to develop the boric acid adsorbed to the resin, and 5 ml aliquots of the boric acid solution eluted from the sixth column was analyzed for the boric acid concentration to find that the boric acid concentration was 0.70 M/l and the amount of the boric acid adsorbed was 0.71 M/l-resin. At that time, the time required from the start of the development with the 0.47 M sulfuric acid aqueous solution to the end was 3.3 hours, and the moving speed of the rear end interface of the boric acid adsorption band was 175 cm/hr.

On the other hand, the $^{10}B/^{11}B$ boron isotope ratio in the boric acid aqueous solution was measured to find that the $^{10}B$ concentration at the most rear end of the boric acid adsorption band was 25.6% and $^{10}B$ had been concentrated at the rear end interface of the boric acid adsorption band over a length of about 40 cm. The separation coefficient calculated therefrom was 1.015 and HETP was 11 mm.

Thereafter, while the column in which the development of the boric acid adsorption band with the sulfuric acid solution had been completed was maintained at 80° C., (1) 2000 ml of a 0.5 N sodium hydroxide aqueous solution was passed at an LV of 5 m/hr, (2) it was washed with 1000 ml of desalted water at the same LV, (3) 2000 ml of a 0.6 N boric acid aqueous solution was passed at an LV of 5 m/hr and (4) 1000 ml of a 0.47 M sulfuric acid aqueous solution was passed at an LV of 3 m/hr, and steps (1) to (4), designated as one cycle, were repeated 28 cycles, after which a separation test of boron isotopes was conducted in the same manner as above and the adsorbing ability and isotope separating ability of the resin against boric acid were measured. First, the boric acid adsorbed to the resin was developed with the 0.47 M sulfuric acid to obtain a concentration of the boric acid aqueous solution of 0.54 M/l and an amount of the boric acid adsorbed of 0.57 M/l-resin, both being considerably reduced. The time required from the start of the development to the end was 3.1 hours and the moving speed of the rear end interface of the boric acid adsorption band was 184 cm/hr.

Further, the boron isotope ratio in the boric acid aqueous solution eluted from the column was measured to find that the $^{10}B$ concentration at the most rear end of the boric acid adsorption band was 28.5% and the $^{10}B$ had been concentrated at the rear end interface of the boric acid adsorption band over a length of about 28 cm. The separation coefficient calculated therefrom was 1.016 and the HETP was 6 mm, thus the isotope separating ability being greatly changed as compared with the first time.

When this measurement was finished, the resin was taken out and subjected to a performance test in the conventional manner to find that the acid adsorbing ability was 2.79 meq/g-resin and the water concent was 63.4%, both being more or less the same as before the test, but the Salt Spliting Capacity was 0.21 meq/g-resin, i.e., reduced to about ⅓ as compared with before the test.

Further, the volume per unit weight of the taken resin (sulfuric acid added form) was measured and the percent increase in volume relative to the regenerated resin (free amine form) was determined as 22%.

What is claimed is:

1. An anion exchange resin for separating boron isotopes comprising a resin having an aminopolyol as a functional group and which has been treated with an alkali solution containing:
    A: an alkali metal hydroxide or ammonium hydroxide; and
    B: an alkali metal salt or an ammonium salt;
    A being 0.5 to 10% by weight based on said alkali solution, and the ratio of equivalents of A to B being from 1:10 to 5:1, said resin adapted to be used in separation of boron isotopes by passing a boric acid solution through a column packed with said resin to form a boric acid adsorption band, and thereafter developing said adsorption band with an acid solution.

2. The anion exchange resin for separating boron isotopes according to claim 1 wherein the polyol group is of the following general formula [I]:

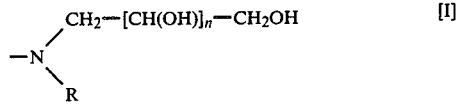

wherein n is an integer of 1–6 and R represents a hydrogen atom, an alkyl group of 1–5 carbon atoms or a group: —CH$_2$[CH(OH)]$_m$—CH$_2$OH wherein m is 0 or an integer of 1–6.

3. The resin of claim 1 wherein said alkali metal hydroxide is NaOH, KOH, or LiOH.

4. The resin of claim 1 wherein said alkali metal salt is NaCl, KCl, Na$_2$SO$_4$.

5. The resin of claim 1 wherein said ammonium salt is ammonim chloride or ammonium sulfate.

6. The resin of claim 1 wherein said alkali solution contains ammonium hydroxide and ammonium sulfate or ammonium chloride.

* * * * *